United States Patent Office 3,835,081
Patented Sept. 10, 1974

3,835,081
TEXTILE ADHESIVE FROM POLYURETHANE
Kenneth H. Remley, Warren Township, Somerset, N.J., assignor to American Cyanamid Company, Stamford, Conn.
No Drawing. Filed July 26, 1972, Ser. No. 275,392
Int. Cl. B32b 7/14, 23/08, 27/40; C08g 22/16
U.S. Cl. 260—29.2 TN                                   6 Claims

ABSTRACT OF THE DISCLOSURE

Polyurethane textile adhesive compositions which furnish films of superior wet strength are obtained by forming an isocyanate prepolymer by reacting polypropylene glycol, 2,2-bis(hydroxymethyl)propionic acid and tolylene diisocyanate wherein the diisocyanate to total glycol molar ratio is between 1.6:1 and 1.8:1 and the reaction is terminated before completion of the reaction, i.e., the reaction is terminated when the unreacted isocyanate ("free NCO") content of the reaction mixture is reduced to from 6.19 to 7.4%.

BACKGROUND OF THE INVENTION

1. Field of the Invention

The invention pertains to the textile adhesive art.

2. Description of the Prior Art

Textile adhesive compositions comprising aqueous dispersions of polyurethane polymers are described in U.S. Pat. 3,640,924 (1972). I have discovered that polyurethane textile adhesive compositions having superior wet strength can be obtained when the isocyanate-terminated prepolymer is formed by reacting polypropylene glycol, 2,2'-bis(hydroxymethyl)propionic acid and tolylene diisocyanate wherein the total glycol molar ratio is between 1.6:1 and 1.8:1 and the reaction is terminated when the free NCO content of the mixture is reduced to from 6.19 to 7.4%.

SUMMARY OF THE INVENTION

Polyurethane textile adhesive compositions in the form of aqueous dispersions which furnish films of superior wet strength are obtained by (1) forming an isocyanate-terminated prepolymer by reacting tolylene diisocyanate with a glycol mixture of polypropylene glycol having a molecular weight between about 900 and 1,200 and 2,2'-bis(hydroxymethyl)propionic acid wherein the diisocyanate to total glycol molar ratio is between 1.6 and 1.75 and the prepolymer reaction is terminated when the free NCO content of the prepolymer is between 6.19 and 7.4% by weight based on the weight of the prepolymers (2) adding the prepolymer to water containing a tertiary aliphatic amine and allowing chain extension to take place and (3) adding a thickening agent to the aqueous dispersion.

DETAILED DESCRIPTION

The invention relates to aqueous adhesive compositions containing dispersed polyurethane polymers having improved wet strength and resistance to laundering.

Large amounts of adhesives are used in the textile field, particularly in the laminating and flocking arts. Laminating involves the bonding of fabrics, both synthetic and natural, either to one another or to other plastic materials to form a multilayer product. Flocking involves the bonding of short, cut fibers in a perpendicular position to a substrate to form a pile-like material.

Flocked fabrics are assuming an increasingly important place in the textile and related industries. These pile-like materials are manufactured, in general, by coating a substrate with an adhesive and then embedding the ends of short, cut fibers in the adhesive. The thickly arranged cut fibers are oriented vertically to the substrate by various means. Suede-, felt- and velvet-like fabrics are obtained with the shortest fibers and rug and carpet materials and fur-like materials with longer fibers. The flocked fabrics find a wide variety of uses including automotive carpets, linings, window channels and weather strippings, simulated suede effects, design flocking of draperies and similar fabrics, floor coverings, wall coverings, paint rollers, etc.

Substrates have included a variety of woven and nonwoven fibrous materials and polymeric sheets, films and foams. Lamination allows the attachment of flocked webs or films to another substrate. Representative substrate materials are cotton, jute, polyester (Dacron), polyvinyl chloride, polyurethane, polyethylene, polystyrene, etc.

A variety of cut fibers or flock, both in the tow and staple forms, are available. They include viscose rayon, nylon, polyester and polyacrylic, in addition to cotton, wool and cellulose acetate.

Various methods are used for coating and orienting the cut fibers of flock with respect to the substrate. Two of the most important are mechanical vibration, as by the beater-bar system, and electrostatic procedures.

The three factors which primarily determine the quality and wearing properties of a flocked product are adhesives, flock and coating technique. For flocking, adhesives must meet several requirements. For example, floor coverings require good anchoring of the coating to the face, excellent adhesion of the pile and highest wearing and scraping resistance in the dry and wet state. Also, the fibers must be fixed in the vertical position with highest durability. The following properties of the adhesive are also important: the rheological properties, the conductivity and sometimes the dielectric constant (particularly for electrostatic flocking), the surface tension to the base and flock material, the nature of the solvents and their evaporative speed, the viscosity-temperature behavior, etc. In addition to securely adhering the flock to the substrate, the adhesive must be curable under desirable and economical conditions, and the cured adhesive must be durable to exposure to solvent, weather, etc. In the apparel field, resistance to dry-cleaning and/or laundering is particularly important.

As indicated above, laminating in the textile field means the bonding of a fabric to the same or different fabric or fabrics or the bonding of one or more fabrics to plastics materials, including films, sheetings and foams.

The fabrics used in laminating may be woven, knitted or nonwoven. They may contain a wide variety of fabrics, both natural and synthetic, including cotton, rayon, linen, wool, silk, polyester, nylon, cellulose acetate, acrylic, modacrylic, etc., and mixtures thereof.

The plastics materials used in laminating are of a wide variety. The plastics are normally limited to thermoplastic polymers, including poly(vinyl chloride), poly (vinyl acetate), cellulose esters such as cellulose acetate and cellulose acetate-butylrate, poly(vinyl butyral), polyethylene, polypropylene, polyurethane, polyamide, polyesters, etc. This wide variety of plastics materials will not necessarily be found in all forms, i.e., film, sheeting and foams. Film and sheeting are largely made of poly (vinyl chloride), although other plastics are extensively used, as well known in the art. The foams are usually made of poly(vinyl chloride) or a polyurethane, but other polymers, such as polyamides, may also be used.

The laminated textile materials are used in many fields, including apparel, home furnishings and automotive uses. The following specific uses are representative. Suit and coat materials having a laminated lining, possibly with a foam interlining, are popular. Laminated synthetic leathers are used in upholstery, handbags, footwear, etc. A typical foamed vinyl synthetic leather is composed of three layers, (1) a textile backing cloth, (2) an expanded (foamed) poly(vinyl chloride) middle layer and (3) a poly(vinyl chloride) sheeting as the top layer.

The adhesives used in textile laminating should provide products having (1) dimensional stability to washing, dry cleaning and pressing, (2) durability of the bond between two components to washing, dry cleaning and pressing and (3) satisfactory handle and drap characteristics. Furthermore, the adhesive composition must be applicable by the conventional methods for applying adhesive to fabrics or plastics materials, as by doctor blade technique using a plain or gravure transfer roll. The adhesive should be sufficiently viscous to prevent penetration into the fabric or foam. It should be flexible, even when fully cured, and should not age. Although many of the adhesives currently used have a solvent base, aqueous base adhesives are desirable since (1) they can be diluted with water for cleaning purposes, (2) they do not present a fire or explosion hazard, and (3) they have less odor and are nontoxic.

I have discovered that polyurethane textile adhesive compositions which furnish films of superior wet strength are obtained by forming an isocyanate-terminated prepolymer by reacting tolylene diisocyanate with a mixture of two glycols, i.e., polypropylene glycol of molecular weight between 900 and 1,200, preferably between 950 and 1050, and 2,2'-bis(hydroxymethyl)propionic acid wherein the diisocyanate to total glycol molar ratio is between 1.6:1 and 1.8:1, preferably between 1.70:1 and 1.75:1, provided the prepolymer reaction is terminated when the free NCO content of the reaction mixture is reduced to between 6.19 and 7.4%, preferably between 6.8 and 7.2% by weight based on the weight of the polymers. The temperature used for reaction between the diisocyanate and glycols should be between about 50° and 80° C. A latex is then formed by reacting the isocyanate-terminated prepolymer in aqueous media containing a tertiary lower alkylamine ($C_1$–$C_3$) and allowing chain extension with water to proceed until substantially all of the isocyanate groups have been reacted. Then a thickening agent is added to the aqueous dispersion.

The amount of water used with the prepolymer in forming the water-extended polyurethane latex is not critical. Latices of solids content from about 10% up to about 60% can be obtained, although a solids content of 25–50% is preferred. Formation of the latex at room temperature is convenient and practical, although higher or lower temperatures may be used.

The tertiary amine present in the water during the latex formation is a tertiary lower alkylamine including trimethylamine, triethylamine and tripropylamine, for exampample, preferably triethylamine. The amount of tertiary amine used should be between 2% and 10%, preferably between 3% and 7%, based on weight of prepolymer.

Proper viscosity of adhesive is important to prevent undue penetration of the adhesive into the substrate to which it is being applied. In other words, the bulk of this adhesive should remain on the surface of the substrate to provide good adhesion. Viscosities in the order of 20,000 to 100,000 cps. are normally satisfactory. Suitable thickening agents are used to obtain the desired viscosity, and they include those well-known in the art such as methyl cellulose, hydroxyethyl cellulose, polyacrylic emulsion plus alkali, gums, etc.

The adhesive of the invention can be used with any of the fabrics and plastic sheeting or foams normally used in the laminating processes, these include woven knit and nonwoven fabrics of natural and synthetic fibers, and a variety of plastic sheeting and foams, but particularly those made of poly(vinyl chloride) or polyurethane. In the flocking processes the adhesive can be used with any of the substrates normally used in the flocking process, including woven and nonwoven fabrics of natural and synthetic fibers, paper, plastic coated fabrics, plastic films and sheets, wood, metal, rubber, glass, etc. Any of the flocking materials may be used. These include both synthetic and natural fibers.

The methods for applying the adhesive to the substrate are conventional and any of the well-known procedures may be used. The assembling of the laminate or flocked fabric is also by conventional procedures. Such methods are well-known in the art.

After the assembly step, it is necessary to dry and cure the adhesive. Drying and curing temperatures between 250° C. and 350° C., preferably between 270° C. and 325° C., are suitable.

The bonding obtained by the adhesive composition of this invention is very durable. It has shown exceptional strength under wet conditions, as during and after laundering.

Other agents may be added to the adhesive composition. For some uses it may be desirable to add a thermosetting aminoplast precondensate, such as melamine-formaldehyde and urea or urea-formaldehyde condensate, to improve the solvent resistance of the adhesive. The preferred aminoplast precondensates are melamine-formaldehyde condensates, including alkyl ethers thereof.

In a particularly favorable procedure, 0.63 mole of polypropylene glycol of molecular weight 1,000 and 0.37 mole of 2,2-bis(hydroxymethyl)propionic acid are combined and reacted with 1.73 moles of tolylene diisocyanate. The ratio of diisocyanate to total glycol is 1.73:1.0. The reaction is continued at a temperature of about 65° C. until the free NCO content of the reaction mixture is 7.0% by weight. The resulting prepolymer is then immediately dispersed in a solution of about 0.036 part of triethylamine in 1.7 parts of water, per part of prepolymer, at a temperature of about 10–20° C. Stirring is continued until a finely divided dispersion is obtained. Finally, the viscosity of the dispersion is adjusted to the desired value by the addition of thickening agents.

The following examples are set forth to illustrate the invention and are not intended to be limitative.

Example 1

To a suitable reactor there was charged 3,550 parts of polypropylene glycol (MW–1025) and 273 parts of 2,2'-bis(hydroxymethyl)propionic acid. The mixture was heated to 55° C., whereupon 1,650 parts of tolylene diisocyanate (80/20 mixture of 2,4- and 2,6-isomers) was added and the temperature was maintained at 60° C. until analysis indicated that the free NCO content by weight was 7.2% of the reaction mixture. (If allowed to go to completion, the reaction would contain about 6% of free NCO.) At this point the prepolymer was added to a vigorously stirred solution of 210 parts of triethylamine in 9,275 parts of water at a temperature of 12–16° C. When the addition was finished, stirring was continued at 30° C. for five hours. The aqueous dispersion was thickened to a viscosity suitable for a textile adhesive composition by the addition of ammonia and a thickener of the acrylic carboxy-containing polymer type.

Example 2

A. A series of prepolymer samples was prepared by reacting together 450 parts (0.4390 mole) of polypropylene glycol (MW–1025), 34.5 parts (0.258 mole) of 2,2'-bis (hydroxymethyl)propionic acid, and 210 parts (1.21 mole) of tolylene diisocyanate (80/20 mixture of 2,4- and 2,6-isomers). The ratio of diisocyanate to total glycol was 1.73:1.0. The mixture was stirred at about 70° C. At hourly intervals, the mixture was analyzed for free NCO and a 50-part sample was removed. Each sample was immediately added to a vigorously stirred mixture of 93 parts of ice and water and 1.87 parts of trimethylamine. Sufficient water (about 12 parts), ammonium hydroxide (about 0.3 parts) and commercial thickening agent of the polyacrylic acid type, Acrysol ASE–60 (Rohm & Haas), (about 3.0 parts) were added to provide the desired viscosity.

The wet strengths of the bonding films provided by the adhesive compositions were measured by (1) placing a swatch of cellulose acetate taffeta on a flat surface, (2) covering the taffeta with a perforated template, (3) spreading the adhesive composition evenly and cleanly across the template thereby applying a pattern of small dots of adhesive to the taffeta, (4) removing the template, (5) placing a swatch of cellulose acetate tricot on the taffeta, (6) pressing the two pieces of fabric together for 30 seconds by the weight of a glass plate, and (7) heating the fabric assembly in an oven at 133° C. for 1½ minutes.

The bonded fabric assemblies were cut into 1-inch strips. Three strips of each fabric assembly were placed in boiling water with stirring for five minutes and then in cool water. Peel strengths of the bonds of the wet strips were measured by a spring scale. The average force in ounces required to peel one fabric from the other of each assembly is shown in the second column "A" of Table I.

B. For comparison, an adhesive composition was prepared by the same general procedure using a polypropylene glycol of molecular weight 2,025 and a ratio of diisocyanate to total glycol of 1.9:1.0. The results are shown in second column "B" of Table I.

TABLE I

| Prepolymer reaction time, hr. | Percent free NCO | | Wet peel strength, oz. | |
|---|---|---|---|---|
| | A [1] | B | A | B |
| 1 | 7.82 | 7.35 | 4.17 | 1.3 |
| 2 | 7.22 | 6.70 | 7.35 | 3.5 |
| 3 | 6.58 | 6.34 | 6.85 | 4.0 |
| 4 | 6.33 | 6.06 | 6.0 | 4.2 |
| 5 | 6.19 | 5.98 | 5.67 | 4.0 |

[1] The free NCO content when the reaction is carried to completion is about 6.1%.

This example demonstrates that adhesive compositions which provide films of superior wet strength can be obtained by using a polypropylene glycol of molecular weight about 1,000 as compared with a polypropylene glycol of molecular weight about 2,000. It also demonstrates that when a polypropylene glycol of molecular weight about 1,000 is employed and the prepolymer reaction is terminated before the reaction is finished, an adhesive composition is obtained which provides a film with superior wet strength.

I claim:
1. In a process for preparing a polyurethane adhesive composition in the form of an aqueous dispersion, the process comprising (1) forming an isocyanate-terminated prepolymer by reacting tolylene diisocyanate with a mixture of two glycols, a polymeric glycol and a nonpolymeric glycol (2) adding the prepolymer to water containing a teritary aliphatic amine and allowing chain extension to take place, and (3) adding a thickening agent to the aqueous dispersion, the improvement which comprises:

using polypropylene glycol of molecular weight between 900 and 1,200 as the polymeric glycol and 2,2'-bis(hydroxymethyl)propionic acid as the nonpolymeric glycol, employing a diisocyanate to total glycol molar ratio of between 1.6 and 1.75 and terminating the prepolymer reaction when the free isocyanate content of the prepolymer is between 6.19 and 7.4% by weight based on the weight of the prepolymer.

2. The process of Claim 1 wherein the prepolymer reaction is terminated when the free isocyanate content of the prepolymer is between 6.8 and 7.2% by weight based on the weight of the prepolymer.

3. The process of Claim 2 wherein the polypropylene glycol has a molecular weight between 950 and 1050 and the diisocyanate to total glycol molar ratio is between 1.70:1 and 1.75:1.

4. An adhesive composition prepared by the process of Claim 1.

5. An adhesive composition prepared by the process of Claim 2.

6. An adhesive composition prepared by the process of Claim 3.

References Cited
UNITED STATES PATENTS 2,968,575    1/1961    Mallonee _____ 260—29.2 TN
3,412,054   11/1968    Milligan et al. ___ 260—29.2 TN
3,640,924    2/1972    Hermann et al. __ 260—29.2 TN MURRAY TILLMAN, Primary Examiner A. H. KOECKERT, Assistant Examiner U.S. Cl. X.R.

161—88, 148, 190, 265; 260—13, 29.4 R, 77.5 AM